June 19, 1956  R. A. SCHAEFER ET AL  2,751,340
METHOD OF PLATING

Filed Jan. 5, 1953  2 Sheets-Sheet 1

INVENTORS,
RALPH A. SCHAEFER
HARRY V. POCHAPSKY
BY HENRY J. SEDUSKY

*Fay & Fay*
ATTORNEYS

June 19, 1956

R. A. SCHAEFER ET AL 2,751,340

METHOD OF PLATING

Filed Jan. 5, 1953

INVENTORS,
RALPH A. SCHAEFER
HARRY V. POCHAPSKY
BY HENRY J. SEDUSKY

*Fay & Fay*

ATTORNEYS

United States Patent Office 2,751,340
Patented June 19, 1956

2,751,340

METHOD OF PLATING

Ralph A. Schaefer, Cleveland, and Harry V. Pochapsky and Henry J. Sedusky, Euclid, Ohio, assignors to Clevite Corporation, Cleveland, Ohio, a corporation of Ohio Application January 5, 1953, Serial No. 329,574

6 Claims. (Cl. 204—23)

The present invention relates to a method and apparatus for electroplating the bearing surfaces of semi-cylindrical flanged bearings with a uniform layer of a bearing metal. Although the invention is described in connection with this use it will also be seen that it can be used for plating the same surfaces of any flanged semi-cylindrical article. Thus it will be seen that this invention is particularly directed to a process and apparatus for plating a uniform layer of metal upon the outer faces of the flanges while maintaining similar uniformity on the internal diameter or concave face of the bearing.

In the process of making plain bearings for internal combustion engines and the like, it has been found that a thin layer of bearing metal which is bonded to an underlying supporting material is highly desirable. The supporting member may be a ferrous material, a combination of layers of ferrous and non-ferrous metals or entirely non-ferrous. This member is processed to practically final dimensions and is in such condition that after the final plating operation, it is unnecessary to perform any subsequent machining operations. Under these conditions it is very important that the thickness of this layer of metal be uniform in dimension. The term "uniformity" as used herein is defined to mean a degree of uniformity in which the variations from the average is not more than 5% in thickness in any direction. Thus, a plated layer of desired thickness of .001 inch can be held to plus or minus .00005 inch.

The bearing surfaces of flanged bearings consist of the inner diameter and the outside faces of the flanges and it is very important that these surfaces be uniform in thickness since any serious non-uniformity will affect the clearance which is allowed between the shaft and the bearing. If this clearance area is too small, seizure of the bearing may occur and if the clearance area is too large, excessive oil leakage and bearing noise will be present. Since these clearances are in the nature of .001 inch it can be readily seen that even small variations in thickness will seriously affect the bearing performance.

In electroplating layers of metal onto curved surfaces, it is very difficult to maintain a uniform thickness of the plated layer. Conventional methods cannot be used for this purpose. A method has previously been disclosed for plating a uniform layer of metal upon the inner diameter of semi-cylindrical plain bearings without flanges and is described in United States Patent 2,500,205 entitled "Method for Plating," owned by the assignee of the present invention. No method has been made available for plating simultaneously the inner diameter and the flange faces of a flanged semi-cylindrical plain bearing and controlling the uniformity of the plated layer.

To the accomplishment of the foregoing and related ends, said invention then consists of the means hereinafter fully described and particularly pointed out in the claims; the following description setting forth in detail one approved means for carrying out the invention; said means, however, constituting but one of the various ways in which the principle of this invention may be employed.

In ordinary practice it is common to plate the same thickness of metal upon the flange faces of bearings as upon the inner diameter although this is not necessary. Following the method of the present invention a uniform layer of metal may be plated upon the flanged faces of greater or less thickness than is plated on the inner diameter.

Figure 1:
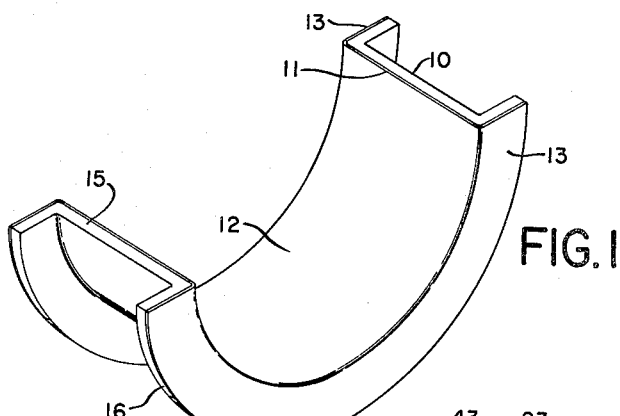
Fig. 1 is a perspective view of a semi-cylindrical flanged bearing which is electroplated on its bearing surfaces.

In Fig. 1 there is shown a semi-cylindrical flanged bearing having a backing member 10 which may be of ferrous metal or a composite of ferrous and non-ferrous metal with an overlay plate 11 which is of uniform thickness on the inner diameter 12 as well as on the flange faces 13. This type of bearing must be held to very close tolerances on all dimensions and as a result it is necessary if the plating operation is not to be followed by subsequent machining operations that the uniformity of thickness of plate be held to the 5% variation previously referred to.

In geometrically describing the article shown in Fig. 1, the edges 15 are the longitudinal edges, the surface 12 is the concave circumferential surface and the flange faces 13 are the outer radial surfaces.

Figure 6:
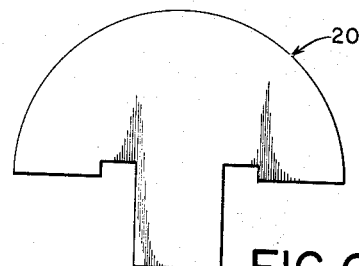
Fig. 6 is a view of a shield used to control the plating current on the flange face of the bearings during the plating process.
Figure 2:
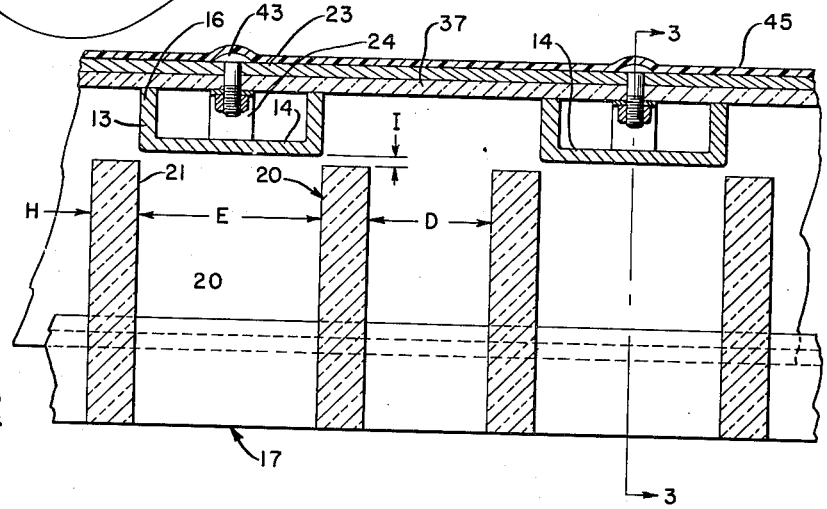
Fig. 2 is a diagrammatic sketch showing the position of the bearings to be plated and the shielding thereof.
Figure 3:
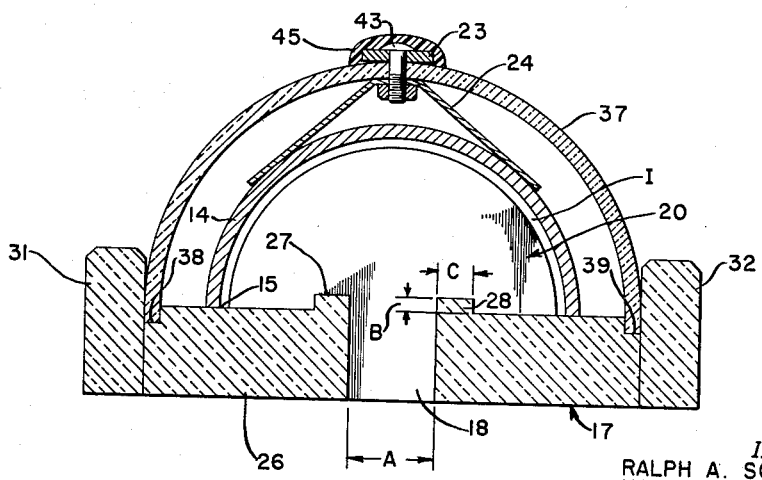
Fig. 3 is an enlarged cross-sectional view taken along the lines 3—3 of Fig. 5.

It has been found that in order to maintain the necessary uniformity during the plating operation, the current density to the various surfaces must be maintained by proper shielding means. In Figs. 2 and 3 there is shown diagrammatically how the bearings are spaced and shielded to obtain the desired results. The bearings 14 are placed with their parting lines 15 flush against an insulating member 17 which contains a lateral slot 18 extending parallel with the parting lines 15. The insulating member, shown generally at 17, contains a lip on the inner side of the slot 18 which has a height B and a width C of a proportion subsequently to be described. It is necessary that the bearing be centrally located with respect to this slot. Inserted in the slot 18 are further insulating or shield members 20 as shown in Fig. 6. These members are inserted so that the face of the shield closest to the I. D. of the bearing is in line with the outer flange face of the bearing. Thus the side 21 of the shield is placed in line with the flange face 13 and the distance E between the shields controlling the plate thickness on the I. D. of the bearing is equal to the distance between the outer faces 13 of the flange. Other distances which must be maintained are the thickness H of the members or shields 20, the distance D between these insulating shields and the distance I which is the clearance between the bearing and the shield member. Another insulating member 37 is placed against the extreme outer edges 16 of the flanges in such a manner as to minimize current flow to the bearing backs by increased electrical resistance. The bearing member 14 is set up as a cathode and current is introduced from an outside source and conducted through a metallic conductor means 23 and hence to the bearing through clips 24. The entire assembly is placed in an electroplating bath and current is passed from an anode in this electrolyte, through the bath including the slot 18 and thence to the surfaces to be plated. Following this procedure it will be found that the uniformity of thickness is within the plus or minus 5% variation previously mentioned if the nominal thickness is in the range of .001 to .005 inch.

Referring to Figs. 2 or 3 there are shown a number of dimensions which it is necessary to control in order to obtain the desired results from this process. Most of these dimensions seem to be related to the diameter of the bearing to be plated and for convenience will be expressed in that way.

A is the width of the slot extending vertically in the face of the insulating member against which the bearings are placed.

B is the height from the inside surface of the insulating member, of the lip extending on each side of the slot adjacent the bearings.

C is the width of this lip.

These three dimensions control the uniformity of plate circumferentially on both the inner diameter of the bearing as well as on the flange faces.

E is the distance between the insulating shields parallel to the inner circumferential face of the bearing.

This dimension controls the uniformity of plate longitudinally on the inner diameter of the bearing.

D is the distance between the insulating shields between the bearings.

H is the thickness of the insulating shields.

These latter two dimensions are believed to control the thickness and uniformity of plate radially across the flange faces and are related to the inner diameter of the bearing and the outer diameter of the edge of the flange. This can be expressed as the width of the flange face.

I is the distance between the outer diameter of the insulating shield and the inner diameter of the bearing. For proper control of current distribution this distance should be held close although it is not critical when the same thickness of metal is being plated on both the I. D. and the flange face. For convenience it can be maintained at approximately $\frac{1}{16}$ inch for most applications, which is mainly for the rapid drainage of the various solutions when the assembly is removed from any tank in the plating cycle.

These dimensions have been carefully worked out after much experimentation and will be given for the condition where the same thickness of the plate is desired on both the inner diameter of the bearing and the outer flange faces. Numerous theories have been advanced concerning the control of these dimensions and it is believed that they are tied in with control of current distribution. No attempt has been made here however to explain them from a theoretical standpoint.

Following are the formulae for determining the various dimensions when it is desired to plate the same thickness of metal upon both outer flange faces and inner diameter and maintain uniformity within plus or minus 5%.

$A =$ 22 to 28% of the inner diameter of the bearing to be plated.

$B =$ 3 to 4% of the inner diameter of the bearing to be plated.

$C =$ 6 to 10% of the inner diameter of the bearing to be plated.

$D =$ 2.0 to 2.5 times (the outer diameter of the flange minus the inner diameter of the bearing divided by two, i.e., the radial width of the flange faces).

$E =$ the distance between the outer flange faces of the bearing.

$H =$ .75 to 1.0 times (the outer diameter of the flange minus the inner diameter of the bearing divided by two, i.e., the radial width of the flange faces).

(I should be held as close as practicable and not over $\frac{1}{16}$ inch).

If it is desired to plate a different thickness on the outer flange faces and inner diameter of the bearing, the dimension D can be varied and thus allow more or less current to pass to the flanges and, as a result, plate thicker or thinner layers.

Following is an example of one method of carrying out the invention by using a plating rack which can be hung vertically in an electroplating bath.

Figure 4:
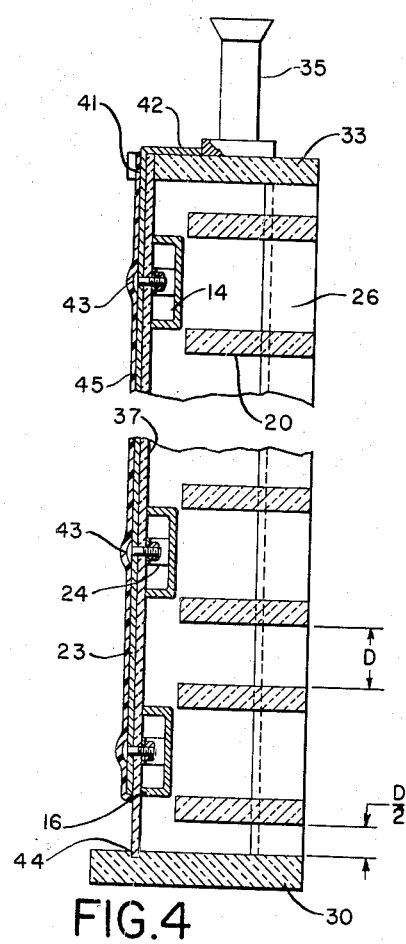
Fig. 4 is a reduced cross-sectional view taken thru a plating rack with bearings in place.
Figure 5:
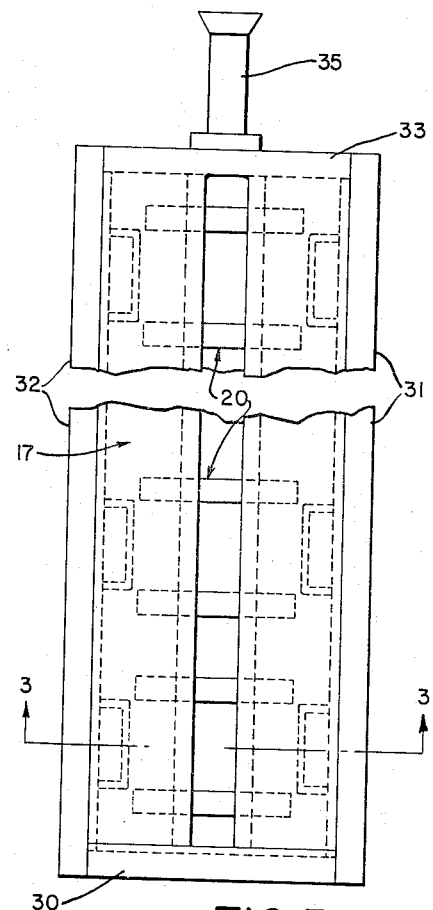
Fig. 5 is a front view of the rack shown in Fig. 4.

Figures 3, 4 and 5 show a rack with flanged bearings and insulating shields in place ready for plating.

The plating box proper consists of a non-conducting material such as hard rubber or plastic and may be formed as shown with a flat front member 26 having the slot 18 and the lips 27 and 28 extending along the face of the rack. It is further provided with a bottom member 30, side members 31 and 32 and a top 33. Attached to the top 33 is a hook 35 for hanging onto an electrical contacting arm during the actual plating cycle. Shield members 20 of non-conducting material are provided and the flanged bearings 14 to be plated are placed between the shields with the parting lines 15 against the front member 26 parallel to the slot and centrally located with respect thereto. The bearings are held in place by means not shown. A flexible cover 37 fits over the back of the rack and contacts the outer edges 16 of the flanges on the bearings to be plated. This cover is held in place by the side members 31 and 32 and is fitted into slots 38 and 39 in the member 26, in another slot 41 in the top member 33 and in the slot 44 in the bottom member 30. A metallic member 23 is fastened to the cover 37 and makes contact with a metal plate 42 on the top of the rack. This member 23 is insulated by any non-conductor 45 to prevent plating upon it during operation. Elements or clips 24 contacting the bearing backs are secured to the cover with fasteners 43. Thus electrical contact can be made from the contact hook 35 through the metallic members 42, 23 and 43 to the bearing to be plated.

In actual operation the shields 20 would be placed in position in the slot 18 and spaced properly, based on the calculation of dimension D. At the bottom of the rack the spacing of the first shield will be one-half of D, since there is only one flange face to be plated in this position. The bearing to be plated is fixed in position with the flange face 13 in line with the face 21 of the shield 20. The next shield is then placed in position in the same manner so that its side 21 is in line with the flange face 13. Bearings and shields are placed alternately and the top spacing is set at one-half of D as at the bottom. In practice the shields would be set in position tightly and stops would be provided for the bearings so that setup time between lots of material being plated would be held to a minimum. After the rack is assembled, it is processed through the various baths of the plating cycle such as cleaners, rinsers and the like until it is finally placed in the electroplating bath. The rack is hung on an electrical contacting hook and current is passed from an anode through the plating solution and to the bearing which acts as a cathode. The inner diameter and outer flange faces will receive a uniform layer of plated metal and the other surfaces of the bearings will be virtually unplated or at most a "flash plate."

As long as the same thickness of metal is being plated on the flange faces and the bearing I. D., the current density on all surfaces of the bearing will be equal and the clearance space I between the shield member and the bearing surface will not be critical. As was stated previously, a dimension of $\frac{1}{16}$ inch is very suitable. However, if it is desirable to place a thicker or thinner layer on the flange face than on the I. D. there must be a different current density on the bearing surfaces and there will then be a tendency for current leakage through the clearance space. Current leakage tends to minimize control and the plate tends to be non-uniform in thickness. It has been found that this clearance space must be adjusted so that the current leakage between the I. D. and the outer flange face is negligible. Under these conditions of negligible current leakage between the bearing and its surrounding shields, the open area D to the flange faces and E to the bearing I. D. can be considered as separate compartments. The electrolyte contained in these compartments acts as a conductor and the current flowing will be directly proportional to the cross sectional area of the electrolyte in accordance with Ohm's law. Therefore the ratio of plate thickness on the flange face to the thickness on the I. D. of the bearing can be varied by adjusting the dimension D. As the distance D increases the thickness of plate on the flange faces increases and as D decreases the reverse is true.

The present invention has special utility when employed at current densities in excess of 5 amperes per square foot since below that figure the uniformity of plated surfaces does not become a real problem for most commercial plating solutions. It can be used with any type of plating bath and has been used successfully with lead, tin and alloys of both. Thicknesses up to .010 inch can be accurately controlled although in most cases the method has been applied for thicknesses less than .005 inch thick.

Although the present invention has been described in connection with a preferred embodiment thereof, variations and modifications may be resorted to by those skilled in the art without departing from the principles of the invention. All of these variations and modifications are considered to be within the true spirit and scope of the present invention, as disclosed in the foregoing description and defined by the appended claims.

We claim:

1. In a method of cathode shield plating to produce a uniform layer of metal upon the concave circumferential surface and the outer radial surfaces of flanged semi-cylindrical shaped articles, which consists of placing the longitudinal edges of the article against an insulating barrier member having a vertical slot therein, said slot being parallel to and centrally located with respect to said longitudinal edges said slot being uniform along the barrier member, enclosing said article so that the other surfaces are electrically insulated, inserting shielding elements in said slot and extending at right angles thereto toward the article and in line with the outer radial surfaces, said shielding elements being semi-cylindrical in shape and having a radius slightly smaller than that of the article and spaced in such a manner that the surfaces to be plated will have a uniform current density when the article and barrier member are inserted in an electroplating bath and a current is passed from an anode outside the barrier member through the bath and slot in the barrier member to the article as a cathode.

2. In a method of electroplating a uniform layer of metal approximately .005 inch or less thick upon the bearing surfaces of flanged semi-cylindrical bearings, the steps of which consist of placing the longitudinal edges of the bearing against and with the concave side facing, an insulating barrier element having a slot opening parallel to and centrally located with respect to the longitudinal edges of the bearing said slot being uniform along the barrier member, said bearing having flanged faces closely adjacent to other insulating barrier members perpendicular to said slot opening acting as current dams and in such manner that the plating current to the inner diameter of the bearing is separated from the current flowing to the flanged faces, enclosing said article so that the other surfaces are electrically insulated, immersing the bearing and barrier elements in an electroplating bath, mounting an anode in the bath external thereto and passing a plating current from said anode to said bearing as a cathode.

3. In a method of electroplating a uniform layer of metal of approximately .005 inch or less thick upon the bearing surfaces of flanged semi-cylindrical bearings, the steps which consist of placing the longitudinal edges of the bearings against and with the concave surfaces facing, an insulating barrier element having a slot opening parallel to and centrally located with respect to the longitudinal edges of the bearings, the width of said slot being 22 to 28% of the diameter of the bearings and being further provided with inwardly projecting lips at each side of said slot with the inward projection of such lips being approximately 3 to 4% of the diameter of the bearings and the width of such lips being approximately 6 to 10% of the diameter of said bearings, and providing insulating shields projecting at right angles from said slots toward the bearing and being so spaced that the opening adjacent to the inner diameter of the bearing provides substantially no current leakage, the shields being 75 to 100% of the width of the flange faces of said bearings and the spacing of the shields between the bearings being 200 to 250% the width of the flange faces of said bearings, immersing the bearings, barrier element and shields in an electroplating bath, mounting an anode in the bath external to the barrier and passing a plating current from said anode to said bearing as a cathode.

4. In a method of electroplating a uniform layer of metal of approximately .005 inch or less thick upon the bearing surfaces of flanged semi-cylindrical bearings, the steps which consist of placing the longitudinal edges of the bearings against and with the concave surfaces facing, an insulating barrier element having a slot opening parallel to and centrally located with respect to the longitudinal edges of the bearings, the width of said slot being approximately 22 to 28% of the diameter of the bearings, shielding the inward end of said slot with lips projecting at each side thereof, with the inward projection of such lips being approximately 3 to 4% of the diameter of the bearings, and the width of such lips being approximately 6 to 10% of the diameter of said bearings, inserting insulating barrier elements projecting from said slots toward the bearings and spaced relative to the inner diameter of the bearing, in order to provide substantially no current leakage therebetween, in which said barrier elements are approximately 75 to 100% of the width of the flanged faces of the bearings, spacing said bearings and the shields relative thereto along the lateral slot in the barrier element so that the space is approximately 200 to 250% of the width of the flanged faces of said bearings, immersing the bearings and barrier elements in an electroplating bath, mounting an anode in the bath external to the barrier and passing a plating current from said anode to said bearings as a cathode.

5. A cathode shield plating rack for plating flanged semi-cylindrical articles on the concave circumferential surface and the outside radial surfaces thereof, comprising a dielectric container member having a vertical slot therein, which is approximately 22 to 28% of the diameter of the article to be plated, said slot having an internal lip in said container which has a width of approximately 6 to 10% of the inside diameter of the article and a height of 3 to 4% of said diameter, a plurality of shield members perpendicular to said vertical slot and semi-circular in shape positioned in said opening, and spaced relative to the radial edges of said article, so that the current leakage in plating is substantially negligible therethrough, said shield members being spaced outwardly of the circumferential portion of said article and being of a thickness approximately 75 to 100% of the width of the radial surfaces of said article, said article and their shield members being spaced relative to one another along said vertical slot in the dielectric container from 200 to 250% of the width of the radial faces, said dielectric container being otherwise impervious to the passage of electric current except through said slot and an electrical contact means to said article in said plating rack.

6. A plating device comprising an elongated box of insulating material adapted to receive a series of semi-cylindrical flanged articles to be plated mounted in spaced endwise relation and having the inner aligned surface thereof facing toward one wall of said box, said box being provided with a longitudinal slot parallel to the axis of said articles and having a width of substantially 22 to 28% of the diameter of each of said articles, said articles being arranged symmetrically with respect to such slot, and the wall of said box having inwardly projecting lips at each side of such slot with the inward projections of such lips being approximately 3 to 4% of the diameter of said articles and the width of such lips being approximately 6 to 10% of the diameter of said articles, insulating shielding means inserted in said slot and extending inwardly into the box and having a semi-cylindrical shape with a radius slightly smaller than the radius of the inner face of the articles, and mounted longitudinally in the slot so that alternate spacing are equal to the overall longitudinal length of the articles and 200 to 250% of the radial dimension of the flange, their thickness being 75 to 100% radial dimension of the flanges, retaining means for maintaining said articles with their outer flange faces in line with the faces of the shields and with an open space between every two shields and with their longitudinal edges against the inner face of said wall of said box having the slot therein, a removable member constituting the wall of said box opposite to the wall provided with such slot, said removable member when in position being adapted to substantially seal the box electrically except for such slot, and current conducting means passing through said box and engaging with one of said members to be plated.

References Cited in the file of this patent

UNITED STATES PATENTS

| | | |
|---|---|---|
| 997,610 | Feldkamp | July 11, 1911 |
| 2,373,352 | Smart | Apr. 10, 1945 |
| 2,500,205 | Schaefer | Mar. 14, 1950 |

FOREIGN PATENTS

| | | |
|---|---|---|
| 986 | Great Britain | of 1896 |
| 335,161 | Great Britain | Sept. 15, 1930 |
| 255,736 | Great Britain | July 29, 1926 |